(12) United States Patent
Chockalingam

(10) Patent No.: US 11,102,696 B1
(45) Date of Patent: Aug. 24, 2021

(54) SYSTEMS AND METHODS FOR HANDOVER WITH DYNAMIC QUALITY OF SERVICE (QOS) IN A 5$^{th}$ GENERATION (5G) NETWORK

(71) Applicant: T-Mobile USA, Inc., Bellevue, WA (US)

(72) Inventor: Ramaswamy Chockalingam, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/880,439

(22) Filed: May 21, 2020

(51) Int. Cl.
| | |
|---|---|
| *H04W 4/00* | (2018.01) |
| *H04W 36/30* | (2009.01) |
| *H04W 36/32* | (2009.01) |
| *H04M 15/00* | (2006.01) |
| *H04W 64/00* | (2009.01) |
| *H04W 80/10* | (2009.01) |
| *H04W 4/90* | (2018.01) |
| *H04W 76/11* | (2018.01) |
| *H04W 8/20* | (2009.01) |
| *H04W 84/04* | (2009.01) |

(52) U.S. Cl.
CPC .......... *H04W 36/30* (2013.01); *H04M 15/66* (2013.01); *H04W 4/90* (2018.02); *H04W 8/20* (2013.01); *H04W 36/32* (2013.01); *H04W 64/00* (2013.01); *H04W 76/11* (2018.02); *H04W 80/10* (2013.01); *H04W 84/042* (2013.01)

(58) Field of Classification Search
CPC ....... H04W 36/30; H04W 4/90; H04W 76/11; H04W 80/10; H04W 64/00; H04W 36/32; H04W 8/20; H04W 84/042; H04M 15/66
USPC ...................................................... 370/331
See application file for complete search history.

(56) References Cited

U.S. PATENT DOCUMENTS

| | | | | |
|---|---|---|---|---|
| 10,687,254 | B2* | 6/2020 | Nimbavikar | H04L 67/306 |
| 2018/0115927 | A1* | 4/2018 | Vesterinen | H04W 36/0055 |
| 2019/0007877 | A1* | 1/2019 | Keller | H04W 36/26 |
| 2020/0374742 | A1* | 11/2020 | Chong | H04W 72/085 |
| 2020/0396621 | A1* | 12/2020 | Park | H04W 72/121 |

* cited by examiner

*Primary Examiner* — Amancio Gonzalez
(74) *Attorney, Agent, or Firm* — Lee & Hayes, P.C.

(57) ABSTRACT

Techniques for performing a handover with dynamic Quality of Service (QoS) in a 5$^{th}$ generation (5G) network are described herein. A user equipment (UE) undergoing a handover is communicatively coupled to the 5G network based on a subscription type of the UE. The 5G network modifies policies and determines modified policies with dynamic QoS associated with the UE based on whether the subscription type restricts access for the UE to a public 5G network or allows the UE to access a private 5G network. The modified policies with dynamic QoS are utilized to determine communication parameters associated with the UE, which are provided to the UE based on a policy control create request transmitted to a policy control function (PCF), a policy modification request transmitted by the PCF to a session management function (SMF), a policy modification response transmitted by the SMF and to the PCF, and/or a policy control create response transmitted by the PCF.

20 Claims, 7 Drawing Sheets

US 11,102,696 B1

SYSTEMS AND METHODS FOR HANDOVER WITH DYNAMIC QUALITY OF SERVICE (QOS) IN A 5$^{th}$ GENERATION (5G) NETWORK

BACKGROUND

Cellular communication devices use terrestrial telecommunication systems to communicate wirelessly. Fifth generation (5G) cellular-wireless access technology is an example of a technology used by telecommunication systems. 5G technology provides improved bandwidth and decreased response times for cellular communication devices than previous technologies (2G, 3G, and 4G technologies).

When a mobile computing device associated with a home network travels outside a geographical coverage area of the home network, the mobile computing device attempts to establish communication via a visited network. The mobile computing device is connected to the visited network via a handover when the mobile computing device is turned on or is transferred to the visited network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
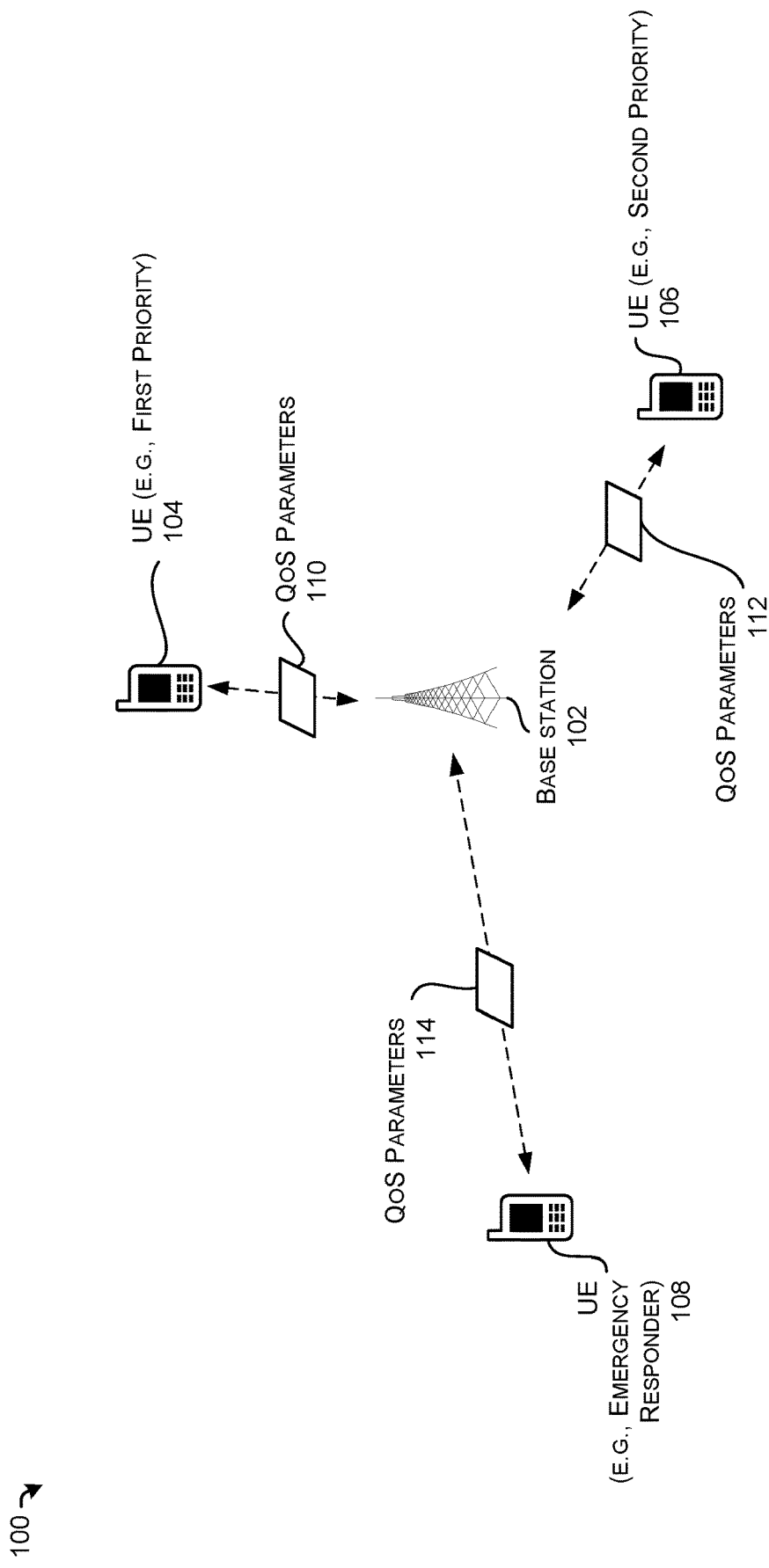
FIG. 1 schematically illustrates an example wireless communication network, in accordance with various configurations.

The systems, devices, and techniques described herein are directed to policy modifications with dynamic QoS during handovers in fifth generation (5G) wireless telecommunication networks. In particular, the systems, devices, and techniques can be implemented in the 5G networks to modify policy rules associated with a user equipment (UE) undergoing a handover associated with the UE. In some examples, a Policy Control Function (PCF) can modify the policy rules associated with the UE. The PCF can provide a policy decision based on whether the UE has a first priority, has a second priority, or is associated with a government or an emergency responder. In other examples, the systems, devices, and techniques can control whether the UE is allowed to access a 5G network, including a private 5G network and/or a public 5G network. The UE can be allowed to access the private 5G network or restricted to the public 5G network. Services can be dynamically allocated to the UE based on policy rules modified during the handover associated with the UE.

In some examples, the PCF can utilize information received from an Access and Mobility Management Function (AMF) to provide the policy decision. The PCF, for example, can receive from the AMF information including, but not limited to, at least one of a Public Land Mobile Network (PLMN) value, a Radio Access Technology (RAT)-Type (RAT-TYPE) value, a Presence Reporting Area (PRA) value, a Tracking Area Code (TAC) value, or a Service Slice Type (SST) value associated with the UE. The PLMN value can provide an identifier of a network from which the UE is coming. The RAT-TYPE can provide a type of RAT used by the UE to connect to a core network in the network from which the UE is coming. The PRA value can provide a location of the UE. The TAC value can provide an identifier of one or more cells assigned to the UE and associated with the network from which the UE is coming. The SST value can provide a network slice that is within the network from which the UE is coming and that is identified by a Single-Network Slice Selection Assistance Information (S-NSSAI) information element. The N-SSAI can include the SST (e.g., 8 bit SST value), and can optionally include a slice differentiator (SD) (e.g., 24 bit SD value). The SD can be provided as a field including the 24 bit SD value of the S-NSSAI in the configured NSSAI for a home PLMN (e.g., HPLMN) to which the SD value is mapped. The S-NSSAI can be included with one or more S-NSSAIs as an NSSAI. In some examples, the SST can be provided as the S-NSSAI. In other examples, the SST can be provided along with the SD. The S-NSSAI can be provided as the SST value or the SST/SD combined value. The SST value can specify a first value associated with 5G enhanced Mobile Broadband, a second value associated with ultra-reliable low latency communications, or a third value associated with massive Internet of Things (IoT). In other examples, the PCF can provide the policy decision by modifying the policy rules associated with the UE based on the PLMN value, the RAT-TYPE value, the PRA value, the TAC value, and/or the SST value.

In other examples, the PCF can use a PRA list to apply modified policies to the UE based on an area in which the UE is located. The PRA list can be implemented to manage Quality of Service (QoS) that is established to enable data to be exchanged between the UE and the 5G network. The PRA list, for example, can be implemented to manage QoS in busy areas, allow location sensitive services, and manage QoS in residential areas.

In some examples, the systems, devices, and techniques can dynamically allocate services associated with the UE based on modified policy rules. The PCF can receive the information from the AMF and allocate the QoS parameters based on the information that is received. The PCF, for example, can allocate QoS parameters including at least one of a QoS Identifier value (e.g., a 5QI value), an Allocation and Retention Priority (ARP) value, and/or one or more bitrate (e.g., Guaranteed Bitrate/Guaranteed Flow Bitrate (GBR/GFBR) and/or Maximum Bitrate/Maximum Flow Bitrate (MBR/MFBR)) value(s) for uplink and/or downlink.

A 5QI value can identify a QoS flow and can be mapped to 5G QoS characteristics. The 5QI value can be associated with a Protocol Data Unit (PDU) session and can be utilized to change technical parameters of the 5G network based on a type of service (e.g., conversational voice, conversational video/live streaming, real time gaming, non-conversational video/buffered streaming, etc.) being provided to the UE. An ARP value can include priority levels (e.g., priority levels 1-8) that are assigned to resources for services authorized to receive prioritized treatment within an operator domain. A GBR can refer to a minimum bit rate at which one or more corresponding type(s) of service(s) are to be delivered through a delivery network(s). A GFBR can be a bit rate expected to be provided by a GBR Flow. An MBR can limit a bit rate that is expected to be provided by a GBR QoS bearer, which provides a dedicated tunnel to one or more types of traffic (e.g., VoIP, video, etc.). The MBR can MBR can limit the bit rate by which traffic is dropped by the 5G network when a service bitrate is above the MBR. An MFBR can limit a bit rate that can be expected to be provided by a GBR QoS Flow. An MBR of a particular GBR bearer can be set to be larger than, or equal to, a GBR.

In some examples, the PCF can allocate a 5QI value to a UE that has a first priority (e.g., a UE associated with a premium subscriber). The PCF can allocate a 5QI value to a UE that has a second priority (e.g., a UE associated with a non-premium subscriber). The PCF can allocate a 5QI value to a UE that is associated with an emergency responder. The 5QI value allocated to the UE that has the first priority can be different (e.g., have a higher level) than the 5QI value allocated to the UE that has the second priority. In some examples, a level of 5QI value can correspond to a quality of a transmission, which can be represented by one or more of transmission characteristics associated with communications with the UE, a latency associated with the communications, etc. In other examples, a higher level of 5QI value can correspond to transmission characteristics associated with the UE after the handover that provide better quality for transmissions than characteristics associated with the UE before the handover. In other examples, a higher level of 5QI value can correspond a latency after the handover that is lower than a latency before the handover.

The 5QI value allocated to the UE that is associated with the emergency responder can be different (e.g., have a higher level) than the 5QI value allocated to the UE that has the second priority. The 5QI value allocated to the UE that has the first priority can be different (e.g., have a higher or lower level) than, or the same as, the 5QI value allocated to the UE that is associated with the emergency responder.

In some examples, an ARP value and/or one or more bitrate value(s) for uplink and/or downlink associated with a UE can be allocated by the PCF in a similar way as for a 5QI value. An ARP value, for example, allocated to the UE that has the first priority or the UE that is associated with the emergency responder can be different (e.g., have a higher level) than an ARP value allocated to the UE that has the second priority. A higher level of ARP value can correspond to a priority level assigned to resources for services for the UE after the handover that is higher than a priority level assigned before the handover. The ARP value allocated to the UE that has the first priority can be different (e.g., have a higher or lower level) than, or the same as, the ARP value allocated to the UE that is associated with the emergency responder.

In some examples, one or more bitrate value(s) for uplink and/or downlink allocated to a UE that has the first priority or the UE that is associated with the emergency responder can be different (e.g., have a higher level) than one or more bitrate value(s) for uplink and/or downlink allocated to the UE that has the second priority. A higher level of the one or more bitrate value(s) can include a guaranteed bit rate after the handover to replace a non-guaranteed bitrate before the handover. The one or more bitrate value(s) for uplink and/or downlink allocated to the UE that has the first priority can be different (e.g., have a higher or lower level) than, or the same as, the one or more bitrate value(s) for uplink and/or downlink allocated to the UE that is associated with the emergency responder.

In some examples, services can be provided by a 5G network, which can include a private 5G network and/or a public 5G network. The services can be provided by the private 5G network with different QoS parameters than for the services provided by the public 5G network. QoS parameters associated with services provided to one or more UE(s) that are allowed to access the private 5G network can be different (e.g., have a higher level) than for QoS parameters associated with the services provided one or more UE(s) that are restricted to the public 5G network.

In some examples, the private 5G network can be a network that has one or more characteristic(s) that are different from one or more corresponding characteristic(s) of the public 5G network. For example, the one or more characteristic(s) can include, but are not limited to, a geographic area at which access to a corresponding network is available, a building and/or structure (e.g., shipping port, airport, industrial complex, etc.) at which access to a corresponding network is available, a time period during which access to a corresponding network is available, etc. The private 5G network can be a network that provides at least one of higher bandwidth, improved reliability, decreased dropped calls, increased efficiency, improved access and availability, improved flexibility, increased opportunities, specialized services, improved security, or better wireless coverage, in comparison the public 5G network.

In some examples, a type of subscription associated with a UE can allow the UE to access the private 5G network based on, but not limited to, a determination that the UE is at and/or near the geographic area at which access to the private 5G network is available, a determination that the UE is at or near the building and/or structure at which access to the private 5G network is available, or a determination that a time period between a time at which the UE is allowed to access the private 5G network and a current time has not exceeded a threshold time.

By way of example, a size of a geographic area at which access for the UE to a private 5G network is available can be smaller than a size of a geographic area at which access for the UE to a public 5G network is available. A size of a location in a building and/or structure at which access for the UE to a private 5G network is available can be smaller than a size of a location in a building and/or structure at which access for the UE to a public 5G network is available. A time period during which access for the UE to a private 5G network is available can be smaller than a time period during which access for the UE to a public 5G network is available.

In some examples, access to the private 5G network can be allowed for a UE based on a determination that a user associated with the UE has a subscription to access the private 5G network. A connection for a UE restricted to the public 5G network can be modified to allow access for the UE to the private 5G network, based on subscription information associated with the user. The subscription information can be stored in one or more storage device(s) associated with the 5G network. The subscription information can be stored based on, for example, initial enrollment of the user to identify the user as being associated with the UE. The subscription information can be stored at the time of the enrollment or subsequent to the time of the enrollment. For example, the subscription information can include, but is not limited to, an identifier of the UE, an identifier of the user, a level of subscription associated with the UE, a type of subscription associated with the UE, etc.

The subscription information stored in the one or more storage device(s) can be utilized to modify the connection for the UE to allow the UE to access the private 5G network based on a request transmitted by the UE, and/or based on a determination by the 5G network to provide the UE access to the private 5G network. The request from the UE or the determination by the 5G network can be based on at least one of, but not limited to, a change in a status of availability of the private 5G network (e.g., an unavailable status of the private 5G network being changed to an available status), a determination by the UE and/or the 5G network that a level of quality of one or more transmission characteristic(s) (e.g., bandwidth, latency, etc.) associated with one or more service(s) available to the UE fall below a threshold level, or a request for registration and/or authentication is transmitted by the UE based on the UE being powered on, moved to a different location, etc.

In some examples, the request can be manually transmitted by the UE based on input that is received by the UE (e.g., via a user interface and/or input/output device including a microphone or a camera, etc.) and from a user (e.g., the user associated with the UE). The input can be received before or during services (e.g., voice call, video call, data services, rich communication service (RCS), etc.) being provided via the UE. The request can be transmitted before or during the services being provided via the UE, based on the input received before or during the services. The UE that is restricted to the public 5G network can be provided access to the private 5G network before, during, or after the services being provided via the UE. For example, the level of quality of the one or more transmission characteristic(s) associated with the one or more service(s) available to the UE that is restricted to the public 5G network can be modified. The level of quality of the one or more transmission characteristic(s) can be modified (e.g., improved) before, during, or after services being provided to the UE, based on the UE being provided access to the private 5G network. The one or more transmission characteristic(s) (e.g., bandwidth, latency, etc.) associated with one or more service(s) available to the UE (e.g., UE with higher priority (e.g., first priority)) based on the UE being provided access to the private 5G network can be higher (e.g., have a higher level) than the one or more transmission characteristic(s) associated with the one or more service(s) available to the UE (e.g., UE with lower priority (e.g., second priority)) that is restricted to the public 5G network.

In some examples, a determination that a UE is associated with a subscription to access a private 5G network can be based on the subscription information and/or access information associated with the subscription information. The access information can be transmitted by a UE and received by a 5G network. For example, the access information can include, but is not limited to, a user name (e.g., identifier) and/or a password (e.g., an encrypted password or an unencrypted password) associated with a subscription of a user associated with the UE. The UE can transmit the access information and/or a request to access the private 5G network based on input associated with the access information being received by the UE (e.g., a user interface, an input/output device, etc.) and from the user. The subscription information and/or the access information can be associated with the UE, the user of the UE, or both the UE and the user of the UE. By way of example, a connection for a UE that is allowed to access the private 5G network can be modified to restrict the UE to the public 5G network based on the subscription information, an automatic request, and/or a manual request, in a similar way, but vice versa, as described above as for the connection for the UE that is restricted to the public 5G network being modified to allow to the UE to access the private 5G network.

In some examples, the services provided via the private 5G network and the public 5G network can be provided with QoS parameters including at least one of a QoS identifier value, an ARP value, or one or more bitrate value(s) for uplink and/or downlink. The services can include voice calls over new radio (NR), video calls over NR, conference calls over NR, and/or RCS calls over NR. The services provided to one or more UE that is allowed to access the private 5G network can be provided with at least one of a QoS identifier value, an ARP value, or one or more bitrate value(s) that is different than for one or more UE that is restricted to the public 5G network.

The systems, devices, and techniques described herein offer various improvements to existing technology. As described above, services can be dynamically allocated to a UE to provide greater control of the UE. By allocating a higher level of service to the UE that has the first priority or the UE that is associated with the emergency responder, signaling overhead can be reduced, data transmission speeds can be increased, and transmission capacity can be increased. By dynamically allocating to devices (e.g., connected devices, connected cars, connected carts, or connected cameras), the speeds at which data can be transmitted by the devices can be controlled. Further, by allocating a lower level of service to the UE that has the second priority, a functioning of the public 5G network can be improved. In some instances, the functioning of the public 5G network can be improved such as reduced congestion, reduced dropped packets, and reduced dropped calls.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for Implementing Handovers in a 5G Network

FIG. 1 schematically illustrates an example wireless communication network 100, in accordance with various configurations. The network 100 (also referred to herein as 5G network 100) can be a 5G network comprising a Base Station (BS) 102. The BS 102, for example, can be communicatively coupled to a plurality of user devices or user equipment, referred to as a User Equipment (UE) 104, a UE 106, and a UE 108. In some examples, the 5G network 100 can perform a handover for the UE 104, the UE 106, and the UE 108. While only three user devices are shown, any number of user devices can be communicatively coupled to the BS 102.

In general, a plurality of UEs including the UE 104, the UE 106, and the UE 108 communicatively coupled to the 5G network can each be implemented as any suitable type of computing device configured to communicate over a wired or wireless network. For example, each of the plurality of UEs can include, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, a connected car, a sensor, a radio-frequency identification (RFID) endpoint device, and/or any similar mobile device, as well as situated computing devices including, without limitation, a television (smart television), set-top-box (STB), desktop computer, an IoT device, and the like.

In some examples, the UE 104, the UE 106, and the UE 108 can access the 5G network 100 via the BS 102. The 5G network 100, for example, can include a core network (e.g., 5G core network) that is responsible for routing communication to other networks, as well as routing data communication to external packet switched networks, such as the Internet. In some examples, one or more core networks (e.g., 5G, 4G, 3G, 2G, Wi-Fi, etc.) can be accessed by the UE 104, the UE 106, and the UE 108. The BS 102 can be associated with new radio (NR) access technology and can communicate with the 5G network 100 via an NR access network that is used to create cell(s) in the 5G network 100. In some examples, each of the UE 104, the UE 106, and the UE 108 can be associated with a PLMN value, a RAT-TYPE value, a PRA value, a TAC value, and/or an SST value used to access the 5G network 100.

In some examples, the 5G network 100 can include a public 5G network and/or a private 5G network. In other examples, communication parameters (e.g., QoS parameters) can be allocated to a UE during a handover of the UE based on the UE being restricted to the public 5G network. In other examples, QoS parameters can be allocated to a UE during a handover of the UE based on the UE being allowed to access the private 5G network.

In some examples, the QoS parameters can be allocated to a UE (e.g., non-roaming UE including any of a plurality of UEs (e.g., UE 104, UE 106, and/or UE 108)) based on the UE being allowed to access the private 5G network in at least one non-roaming scenario. The UE can be provided access to the private 5G network, based on the UE being at an area at which access to a home network with which the UE is associated is available.

In some examples, the QoS parameters can be allocated to a UE (e.g., roaming UE including any of a plurality of UEs (e.g., UE 104, UE 106, and/or UE 108)) based on the UE being allowed to access the private 5G network in at least one roaming scenario. The UE can be allowed to access the private 5G in the roaming scenario based on modified policies with dynamic QoS. The at least one roaming scenario can include, but is not limited to, at least one of domestic roaming, international roaming, inbound roaming, or outbound roaming. As pertaining to domestic roaming, a UE that is allowed access to a domestic network (e.g., T-Mobile network) available at an area at which the UE is located, can be associated with another domestic network (e.g., AT&T network) that is unavailable at the area. As pertaining to international roaming, a UE that is allowed access to a domestic network (e.g., T-Mobile network) available at an area at which the UE is located, can be associated with an international network (e.g., China Mobile network, Vodafone Group network, etc.) that is unavailable at the area. As pertaining to inbound roaming, a UE that is allowed access to a domestic network (e.g., T-Mobile network) available at an area at which the UE is located, can be associated with at least one network (e.g., the AT&T network, the China Mobile network, and/or the Vodafone Group network, etc.) that is unavailable at the area. As pertaining to outbound roaming, a UE that is allowed access a domestic network (e.g., T-Mobile network) available at least one area at which the UE is not located, can be allowed to access at least one other network (e.g., the AT&T network, the China Mobile network, and/or the Vodafone Group network, etc.) that is available at another area at which the UE is located.

In some examples where a UE is restricted to a public 5G network, QoS parameters allocated to that UE can be lower than, or equal to, (e.g., have a lower level or equal level as) the QoS parameters allocated to UEs accessing the private 5G network. The UE being allowed to access the private 5G network can be based on a purchase by a subscriber to which the UE is associated (e.g., a priority of the UE can be established by a payment that is received from the subscriber to cover a cost of a subscription, which can include a first priority subscription (e.g., premium subscription). The subscriber to which the UE being allowed to access the private 5G network is associated can be identified by the 5G network 100 as a first priority subscriber (e.g., premium subscriber), for example, based on the purchase. The UE 104, for example, can be allowed to access the private 5G network of the 5G network 100 based on a subscriber to which the UE 104 is associated having made a purchase for a first priority subscription. The UE 106, for example, can be restricted to the public 5G network of the 5G network 100 based on the UE 106 being associated with a second priority that is less than the first priority.

In general, each of the UE 104, the UE 106, and the UE 108 can be associated with QoS parameters allocated based on priorities of each UE. In some examples, the UE 104 can have a first priority. The UE 104 can receive QoS parameters 110 allocated during the handover based on the UE 104 having the first priority. In other examples, the UE 106 can have a second priority. The UE 106 can receive QoS parameters 112 allocated during the handover based on the UE 106 having the second priority. In other examples, the UE 108 can be associated an emergency responder (e.g., have a third priority). The UE 108 can receive QoS parameters 114 allocated during the handover based on the UE 108 being associated with the emergency responder.

In some examples, a UE (e.g., any of a plurality of UEs including the UE 104, the UE 106, and/or the UE 108) can be provided access to the 5G network 100, based on the UE being at an area at which access to a home network with which the UE is associated is unavailable. The UE can be allowed to access the 5G network 100 based on the UE being located at the area at which access to a visiting network (e.g., visiting network in the 5G network 100) is available. The UE can be allowed to access the 5G network 100 further based on a type of a subscription associated with a user that is associated with the UE. In some examples, a UE located at the area at which access to the home network with which the UE is associated is unavailable can be given access to a public 5G network (e.g., visiting public 5G network in the 5G network 100) that is available at the area, based on the type of the subscription restricting access for the UE to the public 5G network. In some examples, the UE can be given access to a private 5G network, based on the type of the subscription allowing the UE access to the private 5G network. In other examples, the UE can be given access to at least one of the private 5G network or the public 5G network in the 5G network 100, based on the type of the subscription allowing the UE access to the private 5G network.

In some examples, the private 5G network can include, but is not limited to, a network that is, or is associated with, a visiting private 5G network in the 5G network 100. For instance, the UE located at the area at which access to the home network with which the UE is associated is unavailable can be allowed access the visiting private 5G network.

In other examples, the private 5G network can include a network that is, or is associated with, a home private 5G network and/or a home public 5G network in the 5G network 100 to which one or more other UE(s) associated with the home private 5G network and/or the home public 5G network are allowed access at the area at which the UE is located. For instance, the UE located at the area at which access to the home network with which the UE is associated is unavailable can be allowed to access another network (e.g., another home private 5G network and/or another home public 5G network) of the 5G network 100 as a UE that is associated with the other network, or in a similar way as for the UE that is associated with the other network.

By way of example, the UE located at the area at which access to the home network with which the UE is associated is unavailable can be given access to the other home network to which the one or more other UE(s) associated with the other home network available at the area are granted access, based on the type of the subscription allowing the UE to access the other home network. In some examples, the subscription allowing the UE to access the other home network can be a subscription based on an agreement between service providers operating the home network with which the UE is associated and the other home network that is available at the area at which the UE is located.

In some examples, the QoS parameters associated with each of the UEs can be determined based on which network the UE is connected to. The QoS parameters 110 can be different (e.g., have a higher or lower level) than, or equal to, the QoS parameters 114. In other examples, the QoS parameters 110 and/or the QoS parameters 114 can be different (e.g., have a higher level) than the QoS parameters 112.

In some examples, each of the QoS parameters 110, the QoS parameters 112, and the QoS parameters 114 includes at least one of a 5QI value, an ARP value, or one or more bitrate (e.g., GBR/GFBR and/or MBR/MFBR) value(s) for uplink and/or downlink. In other examples, the 5QI value allocated to the UE 104 that has the first priority can be different (e.g., have a higher level) than the 5QI value allocated to the UE 106 that has the second priority. The 5QI value allocated to the UE 108 that is associated with the emergency responder can be different (e.g., have a higher level) than the 5QI value allocated to the UE 106 that has the second priority. The 5QI value allocated to the UE 104 that has the first priority can be different (e.g., have a higher or lower level) than, or the same as, the 5QI value allocated to the UE 108 that is associated with the emergency responder.

The ARP value allocated to the UE 104 that has the first priority can be different (e.g., have a higher level) than the ARP value allocated to the UE 106 that has the second priority. The ARP value allocated to the UE 108 that is associated with the emergency responder can be different (e.g., have a higher level) than the ARP value allocated to the UE 106 that has the second priority. The ARP value allocated to the UE 104 that has the first priority can be different (e.g., have a higher or lower level) than, or the same as, the ARP value allocated to the UE 108 that is associated with the emergency responder.

The bitrate value(s) allocated to the UE 104 that has the first priority can be different (e.g., have a higher level) than the bitrate value(s) allocated to the UE 106 that has the second priority. The bitrate value(s) allocated to the UE 108 that is associated with the emergency responder can be different (e.g., have a higher level) than the bitrate value(s) allocated to the UE 106 that has the second priority. The bitrate value(s) allocated to the UE 104 that has the first priority can be different (e.g., have a higher or lower level) than, or the same as, the bitrate value(s) allocated to the UE 108 that is associated with the emergency responder.

In some examples, a 5QI can be allocated to more than one UE that is allowed to access a private 5G network of the 5G network 100 based on multiple tiers associated with a level of priority (e.g., level of QoS parameters) provided by the private 5G network. In other examples, a UE can be allowed to access a first tier of the private 5G network that has first one or more bitrate value(s) for uplink and/or downlink, or a second tier of the private 5G network that has second one or more bitrate value(s) for uplink and/or downlink.

For example, a level of priority associated with a purchase of a subscriber associated with the UE can be associated with a first the first tier and the second tier. The UE can be allowed to access the first tier or the second tier based on a purchase of a subscriber associated with the UE. In some examples, the UE can be allowed to access the first tier based on a purchase of a subscriber that is associated with the UE and that is of an amount that is higher than an amount to access the second tire. In some examples, a 5QI that is allocated to a UE that is allowed to access the first tier can be the same as a 5QI that is allocated to a UE that is allowed to access the second tier but not the first tier. In other examples, the first one or more bitrate value(s) that are allocated to the UE that is allowed to access the first tier can have a higher level than the second one or more bitrate value(s) that are allocated to the UE that is allowed to access the second tier but not the first tier.

Although the above description includes the first tier and the second tier with which the level of priority is associated, a number of tiers with which the level is associated is not limited to two, and any number of tiers can be associated with the level. Although the above description includes the level that is associated with the first tier and the second tier, a number of levels of priority associated with one or more tiers is not limited to one, and any number of levels associated with one or more tiers can be associated with a UE.

Figure 2:
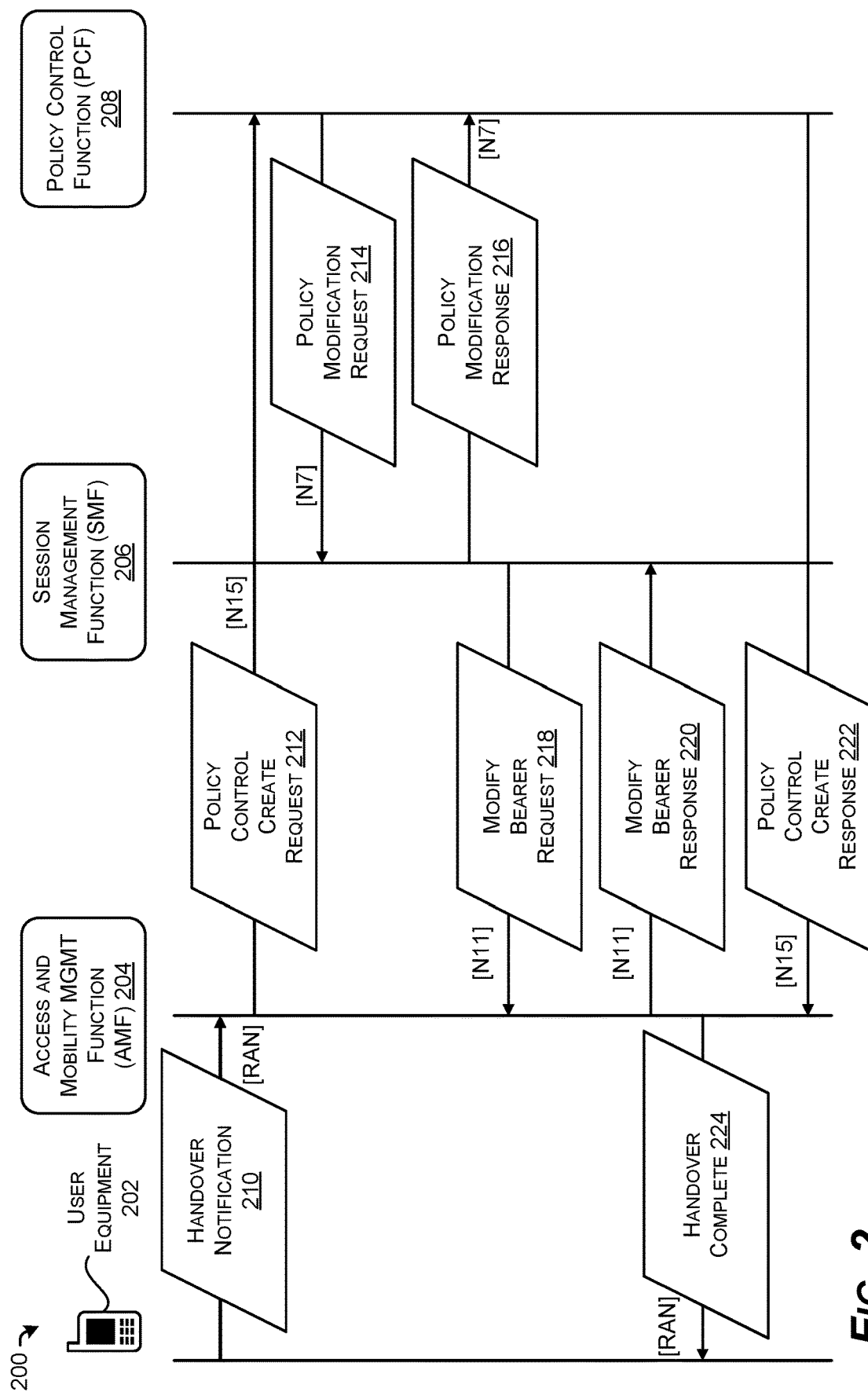
FIG. 2 is a diagram illustrating example signaling between a user equipment (UE) and various components of a wireless communication network, such as a 5$^{th}$ generation (5G) mobile network, as described herein.

FIG. 2 is a diagram illustrating example signaling 100 between a UE and various components of a wireless communication network, such as a 5G mobile network, as described herein. As illustrated, the signaling 200 includes interactions between a UE 202, an Access and Mobility Management Function (AMF) 204, a Session Management Function (SMF) 206, and a Policy Control Function (PCF) 208. The UE 202 can be implemented as one or more of a plurality of UEs communicatively coupled to the BS 102, including any of the UE 104, the UE 106, and the UE 108. As can be understood in the context of this disclosure, the example signaling 200 is not limited to the components described in FIG. 2 and can include other components and operations.

In general, the AMF 204 can be implemented as a network function including functionality to provide UE-based authentication, authorization, mobility management, etc., to various UEs. In some instances, the AMF 204 can include functionality to terminate a Radio Access Network (RAN) Control Plane Interface between the UE 202 and other functions on the network. In some instances, the AMF 204 can include functionality to perform registration management of the UE 202 in a network, connection management, reachability management, mobility management, access authentication, access authorization, security anchor functionality (e.g., receiving and/or transmitting security keys during registration/authorization), and the like.

In general, the SMF 206 can be implemented as a network function including functionality to manage communication sessions by and between UEs, and/or to provide internet protocol (IP) addresses to the UEs. In some instances, the SMF 206 can select a PCF (e.g., visiting PCF) of a plurality of PCFs for a PDU session. The SMF 206 can discover the PCF based on information received from a (NRF), information that is locally configured on the SMF, and/or information that is received from the AMF 204 during the a PDU Session Establishment procedure. For example, the SMF 206 can send a request to the NRF during discovery to identify a PCF (e.g., PCF 206) based on a location (e.g., geo-location) of the UE 202. The SMF 206 can subsequently receive, from the NRF, an identifier of the PCF 206 to be use for communication sessions for the UE 202, based on the location.

In general, the PCF 208 (e.g., visiting PCF) can be implemented as a network function including functionality to interact with an Application Function (AF) and generate Policy and Charging Control (PCC) rules for services delivered via a visiting PLMN (e.g., a visiting PLMN to which the UE is being transferred). The PCF 208 utilizes policies according to a roaming agreement as input for PCC rule generation.

Turning to the signaling 200, the UE 202 can transmit a handover notification (e.g., handover notification signal) 210 to the AMF 204. For example, as the UE 202 moves about an environment, a signal quality can decrease between the UE 202 and a RAN to which the UE 202 is communicatively coupled prior to a handover. Accordingly, the 5G network (e.g., a BS by which the UE accesses the 5G network prior to the handover) or the UE 202 can determine that a handover should occur, based on one or more of, but not limited to: signal strength of an anchor connection (e.g., a signal strength of the RAN to which the UE 202 is communicatively coupled prior to the handover); a signal strength of a target RAN; a latency; a UE speed/direction; one or more traffic level(s); a QoS; etc. As discussed in connection with FIG. 3, the AMF 204, the SMF 206, and the PCF 208 can collectively be referred to as a network.

Although discussed in the context of a 5G network, the signaling 200 and other descriptions in the application apply equally to other wireless telecommunication networks, such as a 4G network. In one example, the UE 202 can transmit the handover notification 210 in response to receiving a handover command from a Mobility Management Entity (MME) (see MME 3XX in FIG. 3) via an Evolved-UMTS Terrestrial Radio Access Network (E-UTRAN).

Next, the AMF 204 can transmit a policy control create request (e.g., policy control create request signal) 212 to the PCF 208. The policy control create request 212 can include a PLMN value, a RAT-TYPE value, a PRA value, a TAC value, and/or an SST value used to access the 5G network 100. In some instances, values including the PLMN value, the RAT-TYPE value, and the TAC value must be included for the policy control create request 212 for purposes of performing the handover. At least one of remaining values including the PRA value and/or the SST value can be optionally included for handover. The policy control create request 212 can be transmitted, for example, via an N15 network interface. In some examples, the policy control create request 212 can be transmitted by the UE 202 to the PCF 208.

Next, the PCF 208 can transmit a policy modification request (e.g., policy modification request signal) 214 to the SMF 206 based on a policy decision of the PCF 208. In some instances, the PCF 208 can transmit the policy modification request 214 based on modified policies with dynamic QoS. The modified policies can be determined based on at least one of the PLMN value, the RAT-TYPE value, the PRA value, the TAC value, the SST value, policy related data, or subscription data (e.g., a subscription type of the UE 202). The subscription data and/or the policy related data associated with the UE 202 can, for example, be received by the PCF 208 and from a Unified Data Repository (UDR). The subscription data associated with the UE 202 can include, for example, an identifier indicating a priority (e.g., a first priority or a second priority) of the UE 202, and/or an identifier indicating the UE 202 is associated with an emergency responder. In some examples, the priority of the UE 202 and whether the UE 202 is associated with the emergency responder can be indicated via a single indicator (e.g., whether the UE 202 is associated with the emergency responder can be indicated by the single indicator as a third priority). The policy related data can include, for example, data indicating a change in at least one of a Multimedia Priority Service (MPS) Evolved Packet System (EPS) priority, MPS priority level, an IP Multimedia Subsystem (IMS) signaling priority, or a change in a user profile configuration indicating whether there is supporting application detection and/or control. In some examples, the policy modification request 214 can include QoS parameters (e.g., policy information based on one or more modified polic(ies)) associated with the UE 202 prior to the handover. The QoS parameters can include at least one of a 5QI value, an ARP value, or one or more bitrate (e.g., GBR/GFBR and/or MBR/MFBR) value(s) for uplink and/or downlink. The QoS parameters can be provided in the policy modification request 214 and by the PCF 208 based on modified policies with dynamic QoS. The policy modification request 214 can be transmitted, for example, via an N7 network interface.

Next, the SMF 206 can transmit a policy modification response (e.g., policy modification response signal) 216 to the PCF 208. In some instances, the policy modification response 216 can be transmitted based on the policy modification request 214, to acknowledge the policy modification request 214. The policy modification response 216 can be transmitted, for example, via an N7 network interface.

At a same or different time as the policy modification response 216, the SMF 206 can transmit a modify bearer request (e.g., modify bearer request signal) 218 to the AMF 204. In some instances, the SMF 206 can transmit the modify bearer request 218 that includes QoS parameters associated with the UE 202 after the handover, based on the modified policies. The QoS parameters associated with the UE 202 after the handover can include least one of a 5QI value, an ARP value, or one or more bitrate (e.g., GBR/GFBR and/or MBR/MFBR) value(s) for uplink and/or downlink. In some examples, QoS parameters associated with the UE 202 after the handover can be different (e.g., have a higher level) than the QoS parameters associated with the UE 202 before the handover. The modify bearer request 218 can be transmitted, for example, via an N11 network interface.

In some instances, the AMF 204 can transmit a modify bearer response (e.g., modify bearer response signal) 220 to the SMF 206, based on the modify bearer request 218 having been received by the AMF 204. The modify bearer response 220 can include an indicator (e.g., modify bearer indicator) to indicate to the SMF 206 that the modify bearer request 218 was received by the AMF 204. The modify bearer response 220 can be transmitted, for example, via the N11 network interface. In some instances, the SMF 206 can transmit the modify bearer request signal 218 and receive the modify bearer response 220, via the N11 network interface, as a response to the policy modification request 214 received by the SMF 206 via the N7 network interface.

At a same or different time as the modify bearer request 218 or the modify bearer response 220, the PCF 208 can transmit a policy control create response (e.g., policy control create response signal) 222 to the AMF 204. The policy control create response 222 can include the QoS parameters associated with the UE 202 after the handover. The policy control create response 222 can be transmitted, for example, via an N15 network interface. In some examples, the policy control create response 222 can be transmitted by the PCF 208 and to the UE 202.

At a same or different time as the policy control create response 222, the AMF 204 can transmit a handover complete (e.g., handover complete signal) 224 to the UE 202. In some examples, the AMF 204 can transmit the handover complete 224 to a Next-Generation Radio Access Network (NG-RAN), which can forward the handover complete 224 to the UE 202. The handover complete 224 can include the QoS parameters associated with the UE 202 after the handover. In some examples, the policy control create response 222 can be transmitted by the PCF 208 and received, as the handover complete 224, by the UE 202.

Figure 3:
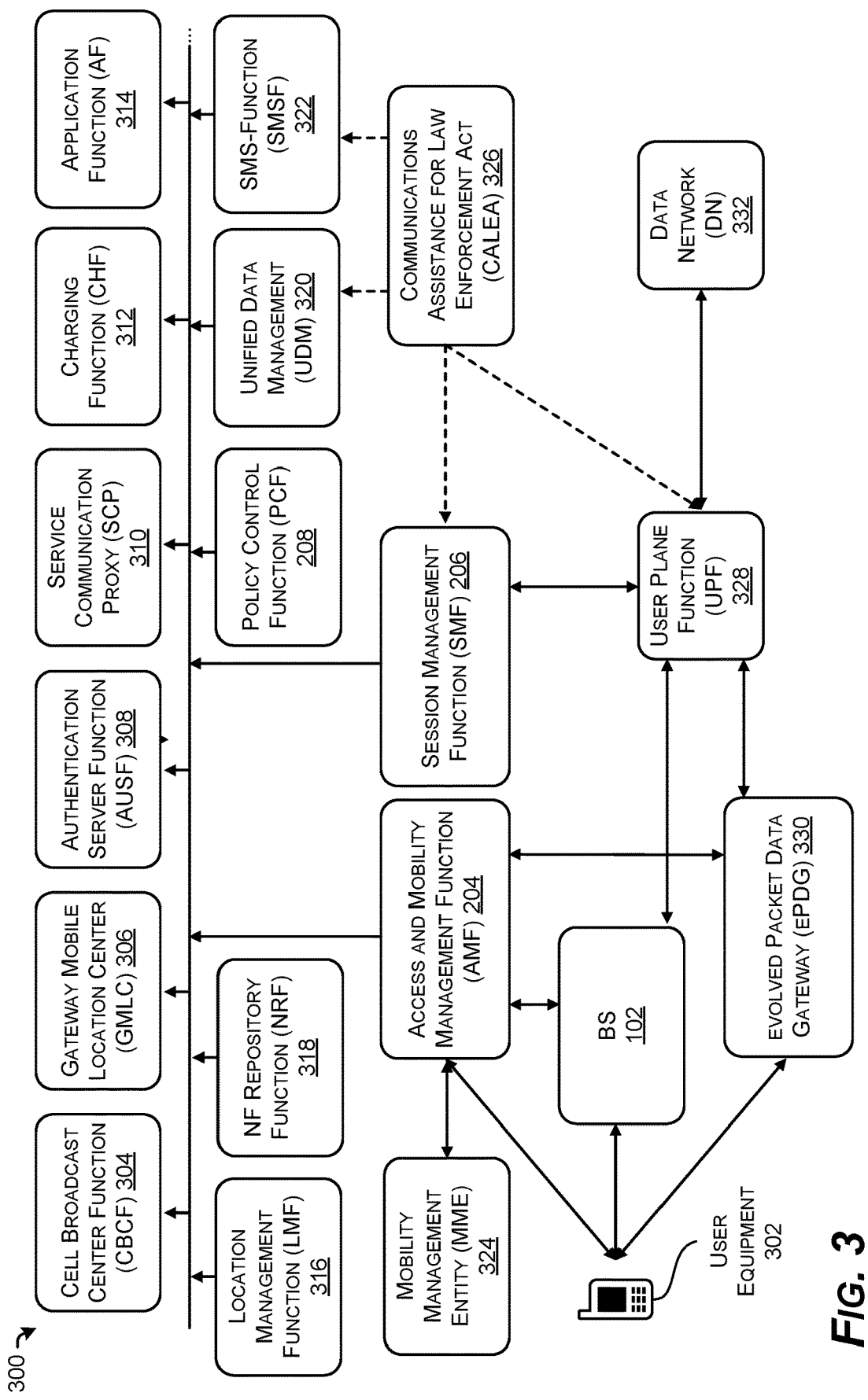
FIG. 3 illustrates an example environment including a UE and various components implementing a handover in a 5G network, as described herein.

FIG. 3 illustrates an example environment 300 including a UE 302 and various components implementing a handover in a 5G network, as described herein. For example, the environment 300 includes the AMF 204, SMF 206, and the PCF 208, as discussed in connection with FIG. 2, as well as a Cell Broadcast Center Function (CBCF) 304, a Gateway Mobile Location Center (GMLC) 306, an Authentication Server Function (AUSF) 308, a Service Communication Proxy (SCP) 310, a Charging Function (CHF) 312, an Application Function (AF) 314, a Location Management Function (LMF) 316, a Network Function (NF) Repository Function (NRF) 318, a Unified Data Management (UDM) 320, a Short Message Service (SMS)-Function (SMSF) 322, a Mobility Management Entity (MME) 324, a Communications Assistance for Law Enforcement Act (CALEA) 326, a BS (e.g., Next Generation NodeB (gNB)) 102, a User Plane Function (UPF) 328, an evolved Packet Data Gateway (ePDG) 330, and a Data Network (DN) 332. The UE 302 can be implemented as one or more of a plurality of UEs communicatively coupled to the BS 102, including any of the UE 104, the UE 106, and the UE 108.

In general, the AMF 204 can be implemented as a network function including functionality to provide UE-based authentication, authorization, mobility management, etc., to various UEs. In some instances, the AMF 204 can include functionality to terminate a RAN control plane interface between the UE 302 and other functions on the network. In some instances, the AMF 204 can include functionality to provide the policy control create request 212 to the PCF 208, receive the modify bearer request 218 from the SMF 206, receive the policy control create response 222 from the PCF 208, and/or provide the handover complete 224 to the UE 202, as discussed herein. In some instances, the AMF 204 can perform registration management of the UE 302 in a network, connection management, reachability management, mobility management, access authentication, access authorization, security anchor functionality (e.g., receiving and/or transmitting security keys during registration/authorization), and the like.

In general, the SMF 206 can be implemented as a network function including functionality to manage communication sessions by and between UEs, and/or to provide IP addresses to the UEs. In some instances, the SMF 206 can receive the policy modification request 214 from the PCF 208, and/or provide the policy modification response 216 to the PCF 208 based on the policy modification request 214, as discussed herein.

In general, the PCF 208 can be implemented as a network function including functionality to support unified policy framework to govern network behavior, provide policy rules to control plane functions and/or enforce such rules, and/or implement a front end to access subscription information relevant for policy decisions in a data repository. In some instances, the PCF 208 can receive the policy control create request 212 from the AMF 204, provide the policy modification request 214 to the SMF 206, receive the policy modification response 216 from the SMF 206, and provide the policy control create response 202 to the AMF 204, as discussed herein.

In general, the CBCF 304 can be implemented as a network function including functionality to manage a Cell Broadcast Service (CBS). The CBCF 304 can use communication services of the AMF 204 to forward warning messages to the NG-RAN and to subscribe to receive warning delivery related notifications.

In general, the GMLC 306 can be implemented as a network function including functionality to provide a Location-Based Service (LBS). The GMLC 306 can request routing information from a home location register (HLR) or a home subscriber server HSS. The GMLC 306 can, after performing a registration authorization, send a positioning request to, and receive final location estimates from, a visited mobile switching center (VMSC), a Serving GPRS Support Node (SGSN) serving GPRS support node (SGSN), or a mobile switching center (MSC) server.

In general, the AUSF 308 can be implemented as a network function including functionality to provide authentication to various devices in the network. For example, the AUSF 308 can request device credentials (e.g., security key(s)), verify that a device is authorized to connect to a network, and/or control access to the network based on the device credentials.

In general, the SCP 310 can be implemented as a network function including functionality to operate as a default output proxy to NF instances or as a router model. For example, the SCP 310 can apply signaling aggregation and routing, and provide load balancing, overload handling, and message parameter harmonization. The SCP can perform delegate discovery, provide communication authorization and security functions, and provide an interworking function for signaling between 2G, 3G, 4G, 5G, IMS, fixed wireless internet, and Wi-Fi.

In general, the CHF 312 can be implemented as a network function including functionality to allow charging services to be offered to authorized network functions and provide converged online and offline charging. The CHF 312 can to differentiate between online and offline charging by granting a specific number of units (e.g., bytes, seconds) to be used for service delivery. The CHF 312 can provide a spending limit report to the PCF 208.

In general, the AF 314 can be implemented as a network function including functionality to route traffic to/from applications operating on the network, provide usage thresholds, and indicate to the PCF 208 whether there are transmission resources for a service. The AF 314 can interact with a policy framework for policy control in connection with the PCF 208, and abort a session based on a session abort indication received from the PCF 208.

In general, the LMF 316 can be implemented as a network function including functionality to provide a location determination for a UE. The LMF 316 can obtain downlink location measurements or a location estimate from the UE, obtain uplink location measurements from an NG-RAN, and obtain non-UE associated assistance data from the NG-RAN.

In general, the NRF 318 can be implemented as a network function including functionality to provide NF service registration and discovery. The NRF 318 can enable NFs to identify appropriate services in one another.

In general, the UDM 320 can be implemented as a network function including functionality to can be implemented as a network function including functionality to process authentication credentials, handle user identification processing, manage registration and/or mobility, manage subscriptions between a UE and a carrier, and or manage SMS data.

In general, the SMSF 322 can be implemented as a network function including functionality to transfer SMS data over a Non-Access-Stratum (NAS). The SMSF 322 can conduct subscription checking and perform a relay function between a UE and SMSF 322, via the AMF 204.

In general, the CALEA 326 can be implemented as a network function including functionality to provide Lawful Interception (LI) of communications. The CALEA 326 can provide designated customer Retained Data (RD) based on received authorization.

In general, the BS 102 can be implemented as a network function including functionality to communicatively couple a UE to a 5C core network via NG interfaces. In some instances, the BS 102 ban include a Next generation NodeB (gNB), or any number and type of base stations representing any number and type of macrocells, microcells, picocells, or femtocells, for example, with any type or amount of overlapping coverage or mutually exclusive coverage.

In general, the UPF 328 can be implemented as a network function including functionality to provide an identifier to the NRF 318 based on a query received from the NRF 318. In some instances, the identifier can include an IP address, network address, or other identifier to uniquely identify the UPF 328 to provide traffic for a communication.

In general, the ePDG 330 can be implemented as a network function including functionality to integrate and perform core network functions including secure data transmission and backhaul security. The ePDG 330 can provide secure data transmission with a UE connected to an Evolved Packet Core (EPC) over an untrusted non-3GPP access (e.g., VoWi-Fi).

In general, the DN 332 can be implemented as a network function including functionality to provide function selection based on utilization level. The DN 332 can include files and databases and identify Service Provider services, Internet access, or third-party services.

In general, the devices and network functions illustrated in the environment 300 can be communicatively coupled via one or more control planes which can pass controls and signaling by and between the various components discussed herein. Further, the environment 300 can include a plurality of each of the various functions (e.g., the AMF 204 can represent a plurality of AMFs, for example). The environment 300 can further include additional functions and is not limited to those represented in FIG. 3.

Figure 4:
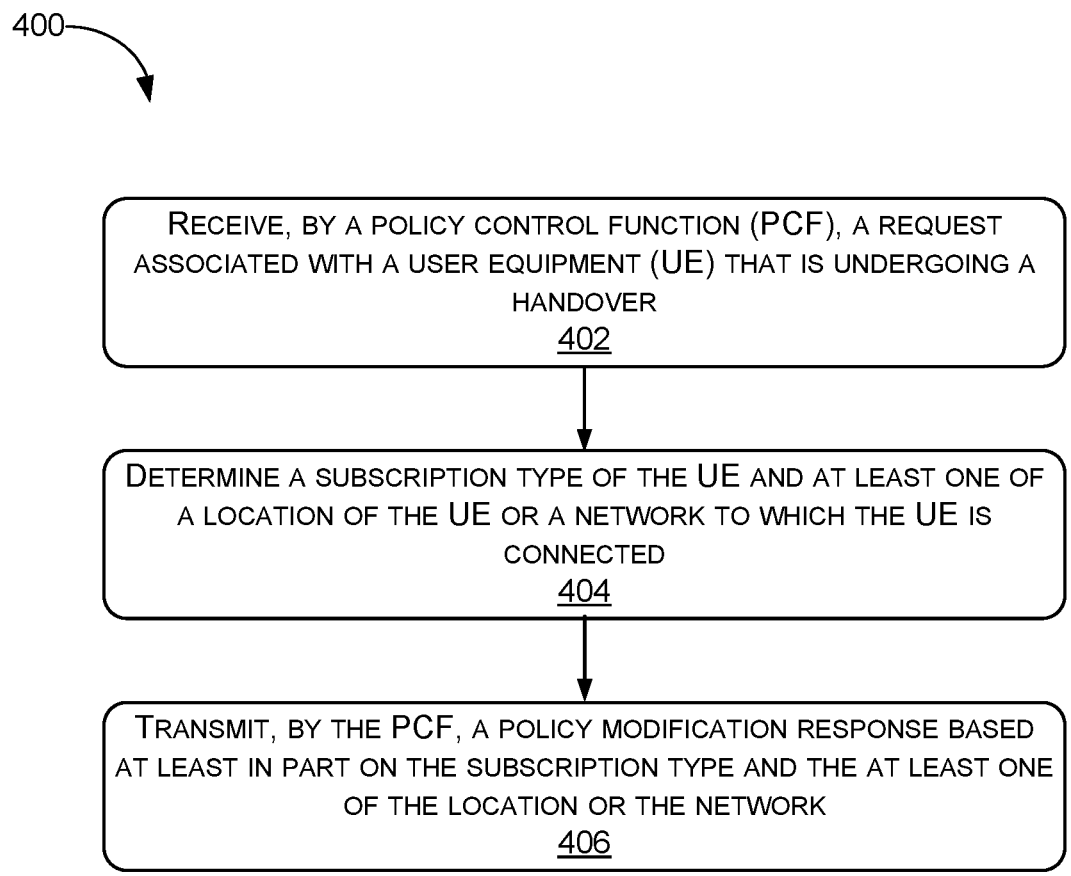
FIG. 4 illustrates an example process for a network that implements a handover in a 5G network.
Figure 5:
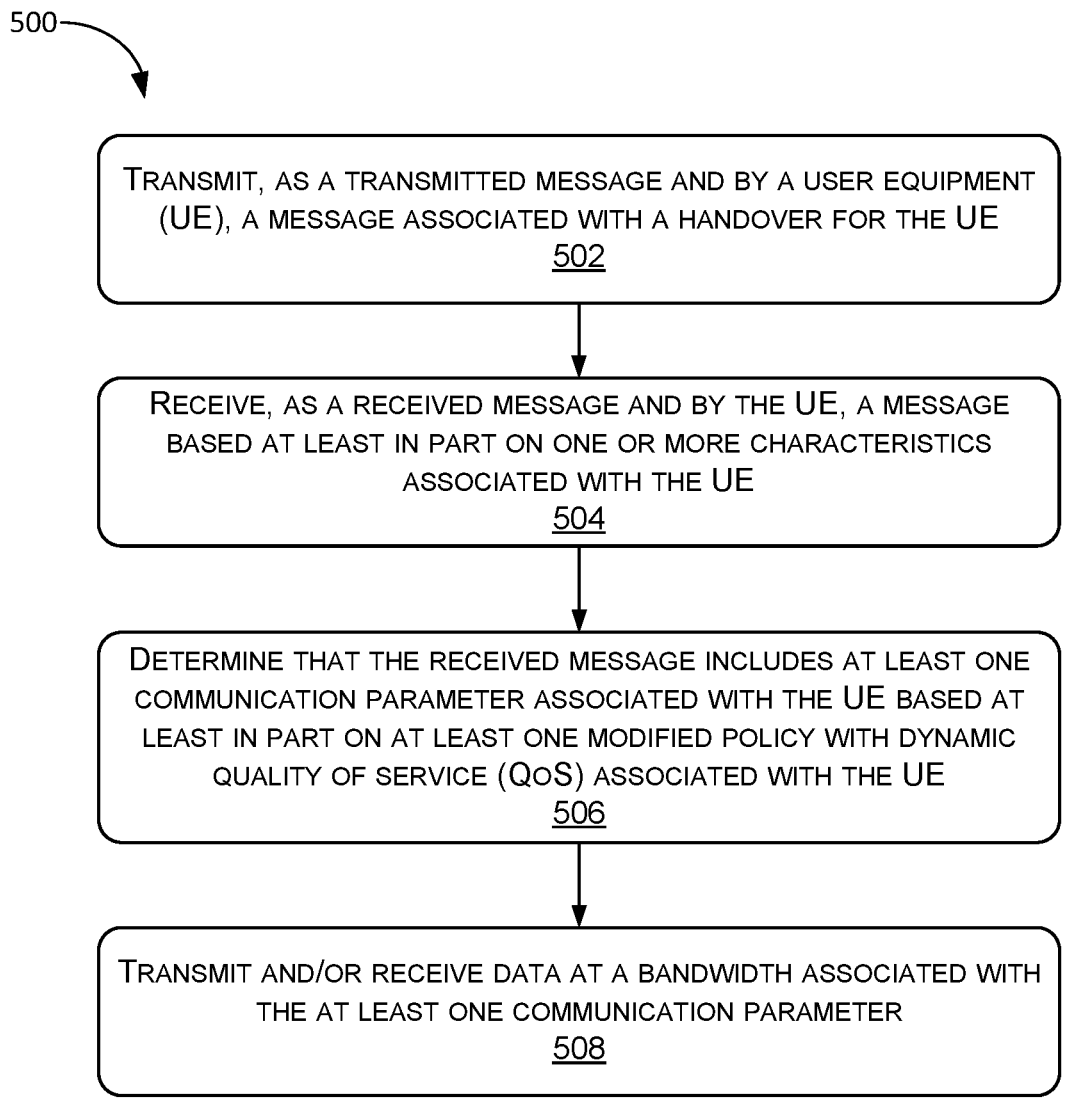
FIG. 5 illustrates an example process for a UE communicating with a network that implements a handover in a 5G network.

FIGS. 4 and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 illustrates an example process 400 for a network that implements a handover in a 5G network. The example process 400 can be performed by the PCF 208 (or another component), in connection with other components discussed herein. Some or all of the process 400 can be performed by one or more devices or components in the environment 300, for example.

At operation 402, the process can include receiving, by a PCF (e.g., PCF 208), a request (e.g., policy control create request 212) associated with a UE (e.g., UE 202) that is undergoing a handover in a 5G network. In some instances, the request can be received from an AMF (e.g., AMF 204) based on a handover notification 210 transmitted, by the UE 202 and via a RAN, and received by the AMF 204. In some instances, the handover notification 210 transmitted by the UE can be received by the PCF 208 as the policy control create request 212. In some instances, the request can include at least one of a PLMN value, a RAT-TYPE value, a PRA value, a TAC value, or an SST value used by the UE to access a 5G network. In some instances, the request can be received via an N15 network interface.

At operation 404, the process can include determining at least one UE characteristic. For example, the operation 404 can include determining a subscription type of the UE 202 and at least one of a location of the UE 202 or a network to which the UE 202 is connected. In some instances, the subscription type of the UE 202 can be determined by the PCF 208 based on subscription data associated with the UE 202. The subscription data can include, for example, an identifier indicating a priority (e.g., a first priority or a second priority) of the UE 202, and/or an identifier indicating the UE 202 is associated with an emergency responder (e.g., third priority). In some instances, the PCF 208 can determine modified policies with dynamic QoS based on the subscription type, and the at least one of the location of the UE 202 or the network to which the UE 202 is connected. For example, the modified policies with dynamic QoS can be determined based on the at least one of the PLMN value, the RAT-TYPE value, the PRA value, the TAC value, or the SST value.

At operation 406, the process can include transmitting a response (e.g., policy control create response 222) based at least in part on the subscription type and the at least one of the location or the network. In some instances, the response can be transmitted by the PCF 208 and to the AMF 204, based on modified policies with dynamic QoS determined by the PCF 208. In some instances, the response can include at least one QoS parameter based on at least one modified policy of modified policies with dynamic QoS. The at least one QoS parameter can be included in the response based on a modification to at least one QoS parameter previously associated with the UE. The QoS parameter having been modified can include one or more of a 5QI value, an ARP value, or one or more bitrate (e.g., GBR/GFBR and/or MBR/MFBR) value(s) for uplink and/or downlink. In some instances, the response can be transmitted via an N15 network interface. In some instances, the response can be transmitted via an N15 network interface, based on a policy modification response 216 transmitted, by the SMF 206 and via an N7 network interface, to the PCF 208. In some instances, the response can be transmitted at a same of different time as a modify bearer request 218 that is transmitted, by the SMF 206 and via an N11 network interface, to the AMF 204. In some instances, the response can be transmitted at a same of different time as a handover complete 224 that is transmitted, by the AMF 204 and via a RAN, to the UE 202.

FIG. 5 illustrates an example process 500 for a UE communicating with a network that implements a handover in a 5G network. The example process 500 can be performed by a UE (e.g., UE 202) or another component, in connection with other components discussed herein.

At operation 502, the process can include transmitting, as a transmitted message, a message associated with the handover. In some instances, the transmitted message can be transmitted by the UE 202 as a handover notification 210. For example, the message can be utilized by an AMF (e.g., AMF 204) to provide one or more characteristics associated with the UE 202 to a PCF (e.g., PCF 208), via an N15 network interface. The one or more characteristics associated with the UE 202 can include, for example, at least one of a PLMN value, a RAT-TYPE value, a PRA value, a TAC value, or an SST value used by the UE 202 to access a 5G network. In some examples, the transmitted message can be received by an AMF (e.g., AMF 204), via a RAN. In other examples, the transmitted message can be received by the PCF 208, via a network interface (e.g., N15 network interface).

At operation 504, the process can include receiving, as a received message, a message based on the one or more characteristics. In some instances, the received message can be received by the UE 202 as a handover complete 224 including at least one of a 5QI value, an ARP value, or one or more bitrate (e.g., GBR/GFBR and/or MBR/MFBR) value(s) for uplink and/or downlink. For example, the at least one of the 5QI value, the ARP value, or the one or more bitrate value(s) can be received based on the at least one of the PLMN value, the RAT-TYPE value, the PRA value, the TAC value, or the SST value. In some examples, the received message can be transmitted by the AMF, via a RAN. In other examples, the received message can be transmitted by the PCF, via a network interface (e.g., N15 network interface).

At operation 506, the process can include determining that the received message includes at least one communication parameter associated with the UE 202 based at least in part on at least one modified policy (e.g., at least one modified policy of modifies policies with dynamic QoS) associated with the UE 202. In some instances, the received message includes the at least one of the 5QI value, the ARP value, or the one or more bitrate value(s), based on the modified policy(ies).

At operation 508, the process can include transmitting and/or receiving data at a bandwidth associated with the at least one communication parameter. In some instances, the data can be transmitted and/or received based on the at least one of the 5QI value, the ARP value, or the one or more bitrate value(s).

Figure 6:
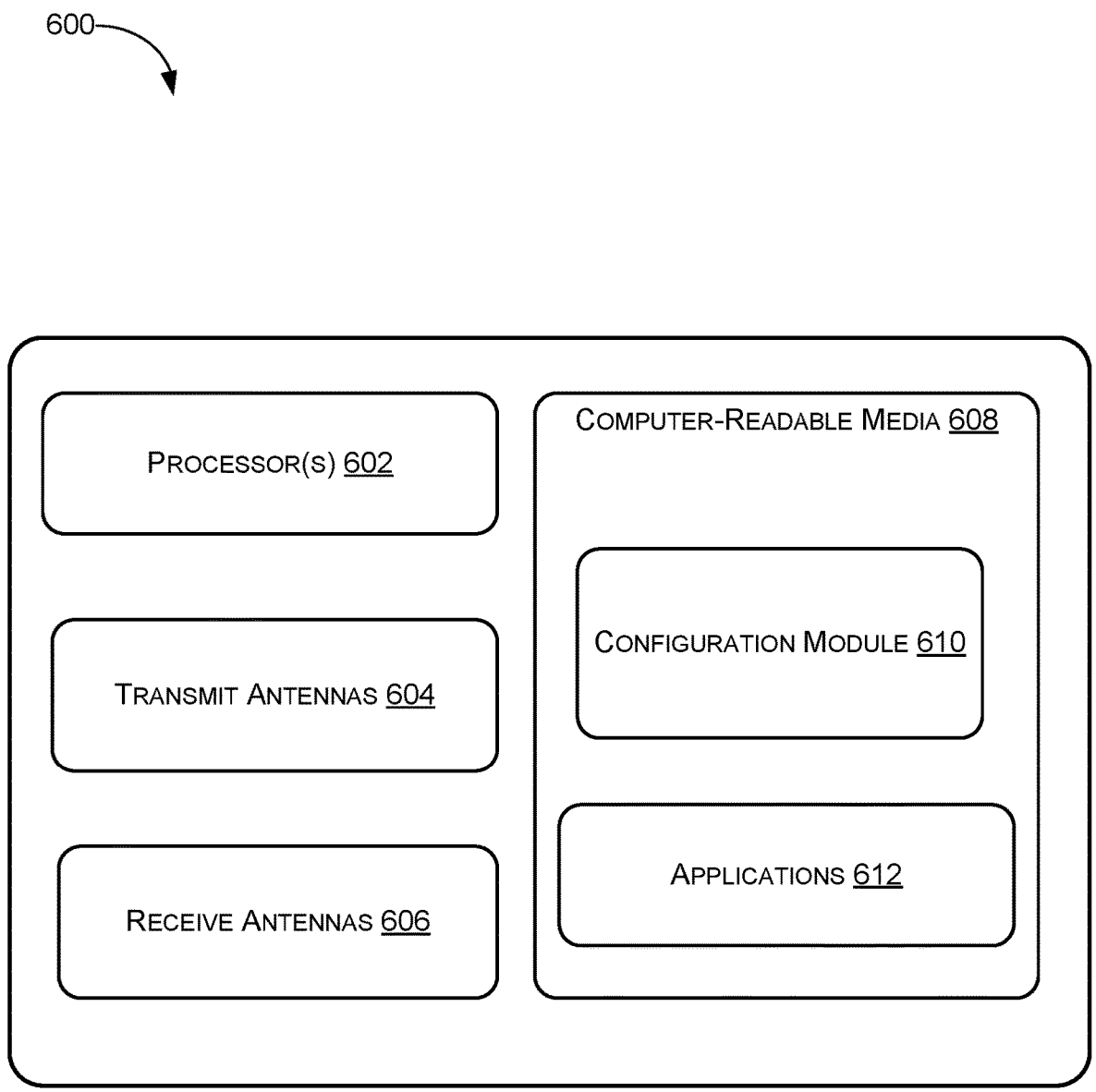
FIG. 6 is an example of a UE for use with the systems and methods disclosed herein, in accordance with some examples of the present disclosure.

FIG. 6 depicts a component level view of a UE 600 (e.g., any of the UEs 104, 106, 108) for use with the methods 400, 500 described herein. The UE 600 may comprise processor(s) 602, one or more transmit antennas (transmitters) 604, one or more receive antennas (receivers) 606, and computer-readable media 60714 in the form of memory and/or cache. The processor(s) 602 may be configured to execute instructions, which may be stored in the computer-readable media 608 or in other computer-readable media accessible to the processor(s) 602. In some configurations, the processor(s) 602 is a Central Processing Unit (CPU), a Graphics Processing Unit (GPU), or both CPU and GPU, or any other sort of processing unit. The one or more transmit antennas 604 may transmit signals to the base station 102, and the one or more receive antennas 606 may receive signals from the base station 102.

The computer-readable media 608 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 600.

The computer-readable media 608 may store several modules, such as instructions, data stores, and so forth that are configured to execute on the processor(s) 602. For instance, the computer-readable media 608 may store a configuration module 610. In configurations, the computer-readable media 608 may also store one or more applications 612 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the base station 102, other UEs, etc.). The applications 612 may also include third-party applications that provide additional functionality to the UE 600.

Although not illustrated in FIG. 1, the UE 600 may also comprise various other components, e.g., a battery, a charging unit, one or more network interfaces, an audio interface, a display, a keypad or keyboard, and other input and/or output interfaces.

Figure 7:
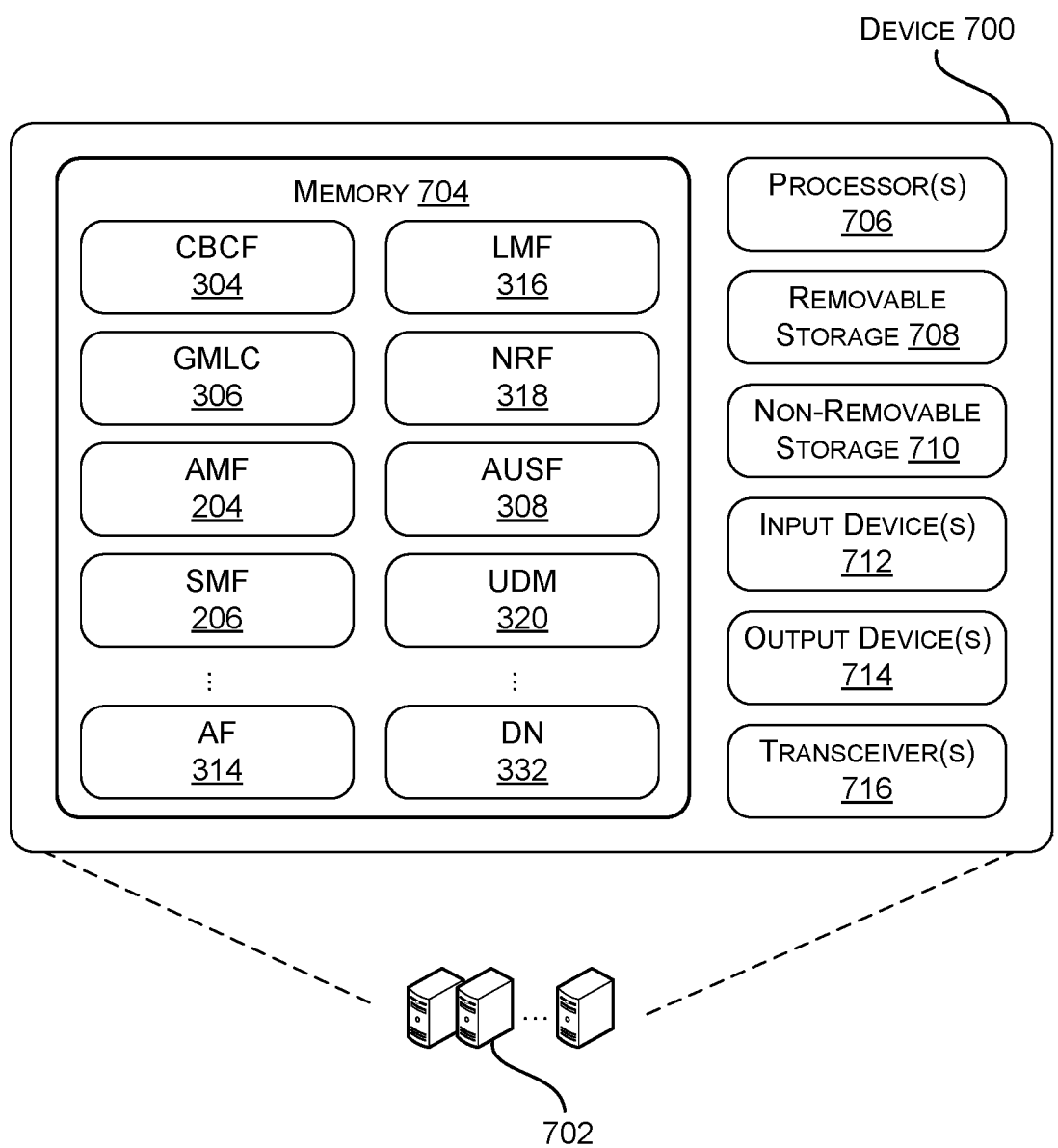
FIG. 7 illustrates an example device 700 to implement the handover in a 5G network, as described herein.

FIG. 7 illustrates an example device 700 to implement the handover in a 5G network, as described herein. In some embodiments, some or all of the functionality discussed in connection with FIGS. 1-6 can be implemented in the device 700. Further, the device 700 can be implemented as a server computer 702, a network element on a dedicated hardware, as a software instance running on a dedicated hardware, or as a virtualized function instantiated on an appropriate platform, such as a cloud infrastructure, and the like. It is to be understood in the context of this disclosure that the device 700 can be implemented as a single device or as a plurality of devices with components and data distributed among them.

As illustrated, the device 700 comprises a memory 704 storing the CBCF 304, the LMF 316, the GMLC 306, the NRF 318, the AMF 204, the AUSF 308, the SMF 206, the UDM 320, the AF 314, and the DN 332 to provide functionality to the device 700 to facilitate improved function selection based on utilization level, as described herein. Also, the device 700 includes processor(s) 706, a removable storage 708 and non-removable storage 710, input device(s) 712, output device(s) 714, and transceiver(s) 716.

Aspects of the CBCF 304, the LMF 316, the GMLC 306, the NRF 318, the AMF 204, the AUSF 308, the SMF 206, the UDM 320, the AF 314, and the DN 332 are discussed above with connection with at least FIGS. 2 and 3. In general, these functions comprise aspects of a 5G mobile network.

In various embodiments, the memory 704 is volatile (such as RAM), non-volatile (such as ROM, flash memory, etc.) or some combination of the two. The CBCF 304, the LMF 316, the GMLC 306, the NRF 318, the AMF 204, the AUSF 308, the SMF 206, the UDM 320, the AF 314, and the DN 332 stored in the memory 704 can comprise methods, threads, processes, applications or any other sort of executable instructions. The CBCF 304, the LMF 316, the GMLC 306, the NRF 318, the AMF 204, the AUSF 308, the SMF 206, the UDM 320, the AF 314, and the DN 332 can also include files and databases.

In some embodiments, the processor(s) 706 is a central processing unit (CPU), a graphics processing unit (GPU), or both CPU and GPU, or other processing unit or component known in the art.

The device 700 also includes additional data storage devices (removable and/or non-removable) such as, for example, magnetic disks, optical disks, or tape. Such additional storage is illustrated in FIG. 7 by removable storage 708 and non-removable storage 710. Tangible computer-readable media can include volatile and nonvolatile, removable and non-removable media implemented in any method or technology for storage of information, such as computer readable instructions, data structures, program modules, or other data. Memory 704, removable storage 708 and non-removable storage 710 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 700. Any such tangible computer-readable media can be part of the device 700.

The device 700 also can include input device(s) 712, such as a keypad, a cursor control, a touch-sensitive display, voice input device, etc., and output device(s) 714 such as a display, speakers, printers, etc. These devices are well known in the art and need not be discussed at length here.

As illustrated in FIG. 7, the device 700 also includes one or more wired or wireless transceiver(s) 716. For example, the transceiver(s) 716 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 716 can utilize multiple-input/multiple-output (MIMO) technology. The transceiver(s) 716 can comprise any sort of wireless transceivers capable of engaging in wireless, radio frequency (RF) communication. The transceiver(s) 716 can also include other wireless modems, such as a modem for engaging in Wi-Fi, WiMAX, Bluetooth, or infrared communication.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A system comprising:
one or more processors;
a memory; and
one or more components stored in the memory and executable by the one or more processors to perform operations comprising:
receiving, by a policy control function (PCF), a policy control create request associated with a user equipment (UE) that is undergoing a handover in a 5G network;
determining a subscription type of the UE and at least one of a location of the UE or a network to which the UE is connected;
transmitting, by the PCF, a policy modification request;
receiving, by the PCF, a policy modification response associated with modified policies with dynamic quality of service (QoS) determined based on the subscription type and the at least one of the location or the network; and
transmitting, by the PCF, a policy control create response based on the modified policies with dynamic QoS.

2. The system of claim 1, wherein the subscription type comprises subscription data comprising at least one of a first identifier indicating a priority of the UE or a second identifier indicating the UE is associated with an emergency responder.

3. The system of claim 1, wherein the subscription type comprises an identifier indicating a first priority of the UE or a second priority of the UE, wherein the first priority corresponds to the UE having a first bandwidth and the second priority corresponds to the UE having a second bandwidth, and wherein the first bandwidth has a higher level than the second bandwidth.

4. The system of claim 1, wherein the subscription type comprises at least one of a first identifier indicating a first priority of the UE that is based on a payment by a subscriber associated with the UE or a second identifier indicating a second priority of the UE that is based on the UE being associated with an emergency responder, wherein the first priority corresponds to the UE having a first bandwidth and the second priority corresponds to the UE having a second bandwidth, and wherein the first bandwidth has a lower level than the second bandwidth.

5. The system of claim 1, wherein the policy control create response comprises at least one QoS parameter associated with the policy control create response and is received by the UE as a handover complete signal, and wherein at least one of an uplink bandwidth or a downlink bandwidth of the UE is dynamically allocated based on the at least one QoS parameter.

6. The system of claim 1, wherein receiving the policy control create request comprises receiving the policy control create request via an N15 network interface, and wherein transmitting the policy control create response comprises transmitting the policy control create response via the N15 network interface.

7. The system of claim 1, wherein transmitting the policy modification request comprises transmitting the policy modification request via an N7 network interface, and wherein receiving the policy modification response comprises receiving the policy modification response via the N7 network interface.

8. The system of claim 1, wherein the policy control create request comprises at least one of a public land mobile network (PLMN) identifier, a radio access technology type (RAT-TYPE) identifier, a presence reporting area (PRA) identifier, a tracking area code (TAC), or a service slice type (SST) identifier.

9. The system of claim 1, wherein:
the policy control create request that is received by the PCF is provided by an access and mobility management function (AMF);
the policy control create response that is transmitted by the PCF is received by the AMF;
the policy modification request that is transmitted by the PCF is received by a session management function (SMF); and
the policy modification response that is received by the PCF is transmitted by the SMF.

10. The system of claim 1, wherein the policy control create response comprises at least one of a 5QI value, an Allocation and Retention Priority (ARP) value, a one or more uplink bitrate value, or one or more downlink bitrate value.

11. A method comprising:
receiving, by a policy control function (PCF), a request associated with a user equipment (UE) that is undergoing a handover in a 5G network;
determining a subscription type of the UE and at least one of a location of the UE or a network to which the UE is connected; and
transmitting, by the PCF, a response based at least in part on the subscription type and the at least one of the location or the network.

12. The method of claim 11, wherein the subscription type comprises subscription data comprising at least one of a first identifier indicating a priority of the UE or a second identifier indicating the UE is associated with an emergency responder.

13. The method of claim 11, wherein the subscription type comprises an identifier indicating a first priority of the UE or a second priority of the UE, wherein the first priority corresponds to the UE having a first bandwidth and the second priority corresponds to the UE having a second bandwidth, and wherein the first bandwidth has a higher level than the second bandwidth.

14. The method of claim 13, wherein:
the subscription type comprises at least one of a first identifier indicating a first priority of the UE that is based on a payment by a subscriber associated with the UE or a second identifier of the UE that is based on the UE being associated with an emergency responder,
the first priority corresponds to the UE having a first bandwidth and the second priority corresponds to the UE having a second bandwidth, and
the first bandwidth has a lower level than the second bandwidth.

15. The method of claim 11, wherein the request comprises at least one of a public land mobile network (PLMN) identifier, a radio access technology type (RAT-TYPE) identifier, a presence reporting area (PRA) identifier, a tracking area code (TAC), or a service slice type (SST) identifier.

16. The method of claim 15, wherein the response comprises at least one of a 5QI value, an Allocation and Retention Priority (ARP) value, or one or more bitrate values for uplink and/or downlink.

17. A method comprising:
transmitting, as a transmitted message and by a user equipment (UE), a message associated with a handover for the UE;
receiving, as a received message and by the UE, a message based at least in part on one or more characteristics associated with the UE;
determining that the received message includes at least one communication parameter associated with the UE based at least in part on at least one modified policy associated with the UE; and
transmitting or receiving data at a bandwidth associated with the at least one communication parameter.

18. The method of claim 17, wherein the at least one modified policy associated with the UE is based at least in part on at least one a priority of the UE established by a payment by a subscriber associated with the UE or the UE being associated with an emergency responder.

19. The method of claim 17, wherein the one or more characteristics associated with the UE comprise at least one of a public land mobile network (PLMN) identifier, a radio access technology type (RAT-TYPE) identifier, a presence reporting area (PRA) identifier, a tracking area code (TAC), or a service slice type (SST) identifier.

20. The method of claim 19, wherein the at least one communication parameter associated with the UE comprises at least one of a 5QI value, an Allocation and Retention Priority (ARP) value, or one or more bitrate values for uplink and/or downlink.

* * * * *